July 10, 1923.
E. E. NICHOLS
AEROPLANE
Filed July 25, 1921
1,461,700
3 Sheets-Sheet 1
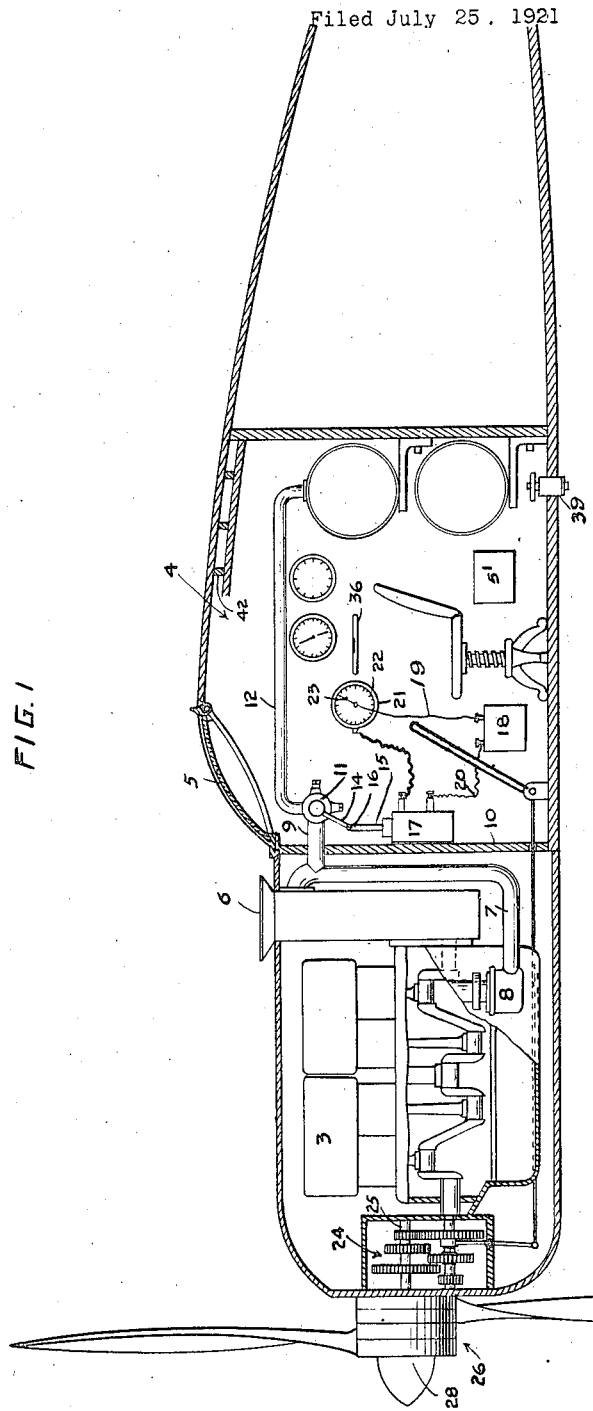
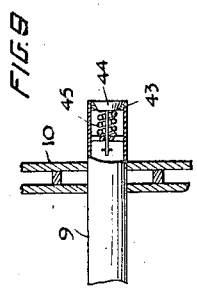
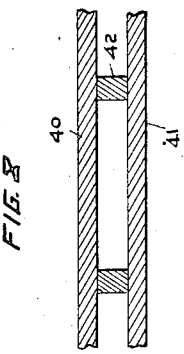
INVENTOR
E. E. NICHOLS
ATT'YS.

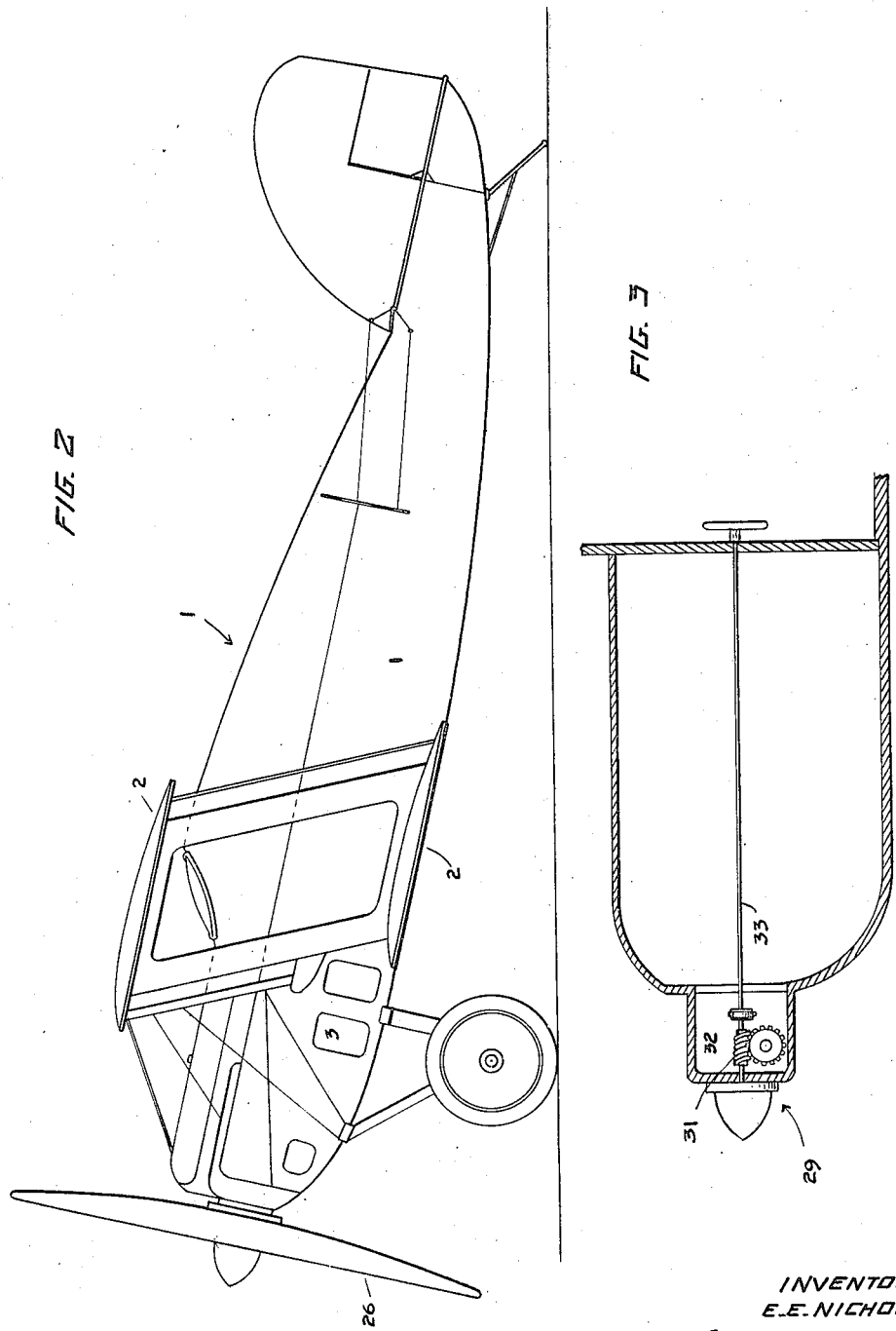

July 10, 1923.  1,461,700
E. E. NICHOLS
AEROPLANE
Filed July 25, 1921  3 Sheets-Sheet 3
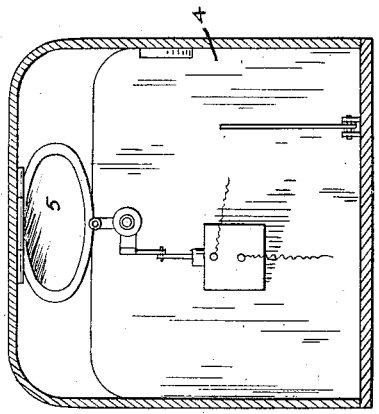
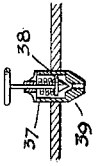
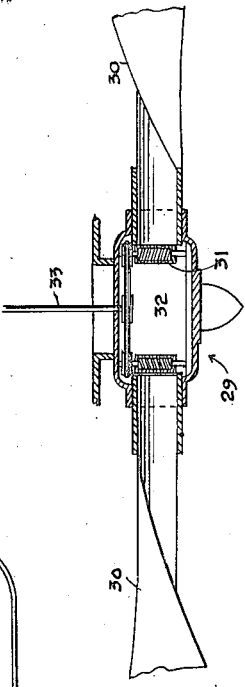
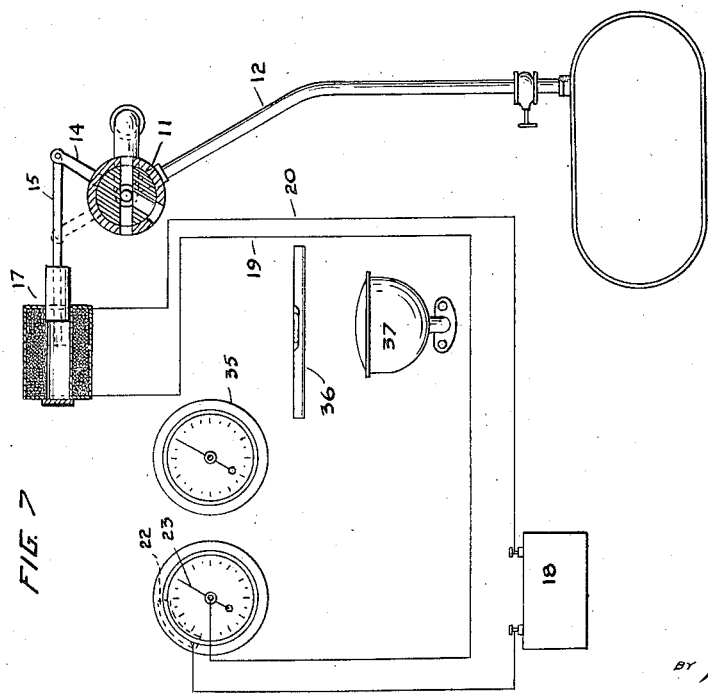
INVENTOR
E.E.NICHOLS
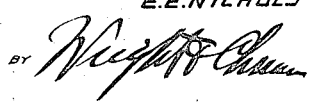
ATT'YS.

Patented July 10, 1923.

1,461,700

UNITED STATES PATENT OFFICE.

ELMER E. NICHOLS, OF OAKLAND, CALIFORNIA.

AEROPLANE.

Application filed July 25, 1921. Serial No. 487,383.

*To all whom it may concern:*

Be it known that I, ELMER E. NICHOLS, a citizen of the United States, residing at Oakland, in the county of Alameda and State of California, have invented new and useful Improvements in Aeroplanes, of which the following is a specification.

The present invention relates to improvements in aerial vehicles of the aeroplane type and contemplates the provision of an aeroplane which will be suitable for flying in high altitudes, for instance, from 30,000 feet and upwards, at great speeds, for instance, from 200 to 500 miles per hour, there being provided means for and maintaining air pressure at or about 14 lbs. per square inch, in the compartment for the pilot and passengers, means for supplying oxygen in emergency cases, means for increasing the effectiveness of the propeller so that suitable propeller efficiency is obtained in the rare atmosphere encountered at such elevations and means for supplying air in suitable quantity and pressure to the engine whereby the engine will operate efficiently in high altitudes.

With the ordinary aeroplane, in flying in high altitudes, the speed of the plane decreases as one ascends, although the rarity of the atmosphere is such that the head resistance of the plane is materially lessened. For this reason a plane should be able to travel at greater speed than in lower altitures if the same propeller thrust is maintained. The propeller of an ordinary aeroplane is not capable of propelling the aeroplane at appreciably greater speeds in high altitudes, because the pitch is not great enough and the engine loses power, in other words, aeronauts have not heretofore been able to successfully take advantage of the atmospheric conditions which permit of greater speed because of less head resistance offered to the plane. These difficulties, together with the difficulty of providing air at suitable pressure to the operator or pilot and air at proper pressure for motor, have been a serious drawback to the attempts at successful operation of aeroplanes in high altitudes.

With the hereinbefore noted objections and difficulties relative to flying in high altitudes in view, it is the primary object of my invention to provide an areoplane of a general construction and arrangement such that the operation of the plane may be carried out with comfort and safety in very high altitudes and at relatively greater speeds than have heretofore been attained in high altitude flying.

Another object of the invention is to provide in an areoplane of the character described, an arrangement whereby a portion of the air from the engine "super-charger" will be delivered to an air-tight operator's and passenger's compartment, so as to maintain the desired air pressure within said compartment.

Another object of the invention is to provide auxiliary oxygen and air tanks and an arrangement whereby, should the atmospheric pressure within the operator's compartment become too low, that is, fall below, say, twelve pounds to the square inch, the "super-charger" supply of air will be automatically cut off and the air or oxygen supply, or both automatically admitted into said compartments.

A further object of the invention is to provide means for controlling the operation of the propeller so as to provide for the effective operation of the propeller in high altitudes, this being accomplished by operating the propeller at a speed greater than the speed necessary to maintain flight in low altitudes through transmission gearing; or by increasing the pitch of the propeller blades so as to advance the plane faster for each turn of the propeller than at low altitudes.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

In the drawings:

Fig. 1 is an enlarged longitudinal sectional view of the fuselage of an aeroplane of my invention showing the off-set propeller blades with fixed pitch together with the multi-speed transmission means.

Fig. 2 is a side elevation of an aeroplane constructed in accordance with my invention wherein the propellers are adjustable as to pitch.

Fig. 3 is a fragmentary longitudinal sectional view particularly illustrating the means for adjusting the pitch of the propeller blades.

Fig. 4 is a cross sectional view thru the operator's compartment.

Fig. 5 is a fragmentary horizontal sectional view of the adjusting means for the variable means of propellers.

Fig. 6 is an enlarged vertical sectional view of the ventilating or escape valve.

Fig. 7 is a diagrammatic view of the automatic controlling means for regulating atmospheric pressure in the operator's compartment.

Fig. 8 is an enlarged fragmentary cross sectional view showing the manner in which the operator's compartment is to be constructed so as to thermally insulate the same.

Fig. 9 is a sectional view partly in elevation of a modified form of valve for controlling the flow of air from the super-charger into the operator's chamber.

In carrying out my invention, I construct an aeroplane with an air-tight operator's compartment and provide, in connection with the usual motor, a "super-charger" of any well known type. The "super-charger" is arranged so as to discharge sufficient air into the operator's compartment to maintain the desired atmospheric pressure. In connection with the "super-charger" and compartment, I provide tanks arranged to discharge oxygen and air into the compartment, there being provided means in said compartment for automatically cutting off the "super-charger" air supply to the compartment and then automatically discharging air and oxygen from the tanks into said compartment at any time that the atmospheric pressure in the compartment passes below a safety factor. There is also provided means controllable from said compartment for controlling and regulating the operation of the propellers so as to maintain the same propeller efficiency in high altitudes as in low altitudes. The oxygen tank is an emergency means used in case one is compelled to use the same air for some time.

It will, therefore, be seen that the foregoing element and features of my invention correlate and co-operate to overcome the objections heretofore encountered in high altitude flying. Therefore, it is believed an aeroplane constructed in accordance with my invention may ascend to relatively high altitudes from 30,000 to 50,000 feet and be propelled at a great speed of from 200 to 500 miles per hour without placing any damaging strains or stresses upon the parts of the plane and without causing any discomfort or subjecting the operator and passengers to any greater hazard than is incurred in normal flying in low altitudes.

Referring to the present embodiment of the invention illustrated in the accompanying drawings, there is provided an aeroplane which, in this instance, is of the biplane type, and embodies in its construction a fuselage 1, the usual wings 2, motor 3 and the other customary aeroplane elements. The fuselage 1 is provided with an air-tight suitably thermally insulated operator's and passenger's compartment 4, having a suitable glass window 5 at the forward upper edge thereof. Heating may be accomplished by any suitable means as at 5'.

Associated with the engine in the customary manner is a "super-charger" 6 of any suitable type. The pipe 7 from the "super-charger" which leads to the carburetor 8 has a branch pipe 9 connected therewith and extended thru the front wall 10 of the compartment 4 and into said compartment. In this way a portion of the air supplied to the carburetor from the "super-charger" is directed into the chamber 4. The pipe 9 carries upon its inner end a two-way valve 11 with which an oxygen supply pipe 12 is operatively associated. The pipe 12 leads to oxygen supply tanks, which, although shown as carried within the compartment 4, may be disposed at any other point upon the fuselage. When the valve 11 is in one position, the oxygen supply pipe 12 is closed and the air supply pipe 9 from the "super-charger" is open, this being the normal position of the valve. When the valve is in its other position, the air supply from the pipe 9 is shut off and the oxygen pipe 9 opens to allow oxygen to enter said compartment.

Means is provided for automatically operating the valve 11. This means comprises a valve handle 14 to the free end of which a solenoid armature 15 is pivoted as at 16. The solenoid 17 is suitably mounted within the compartment 4 and is electrically connected in series with a suitable source of electric energy 18 by means of conductors 19 and 20. Connected in series with the conductor 19 is a barometer 21 which serves as an automatic circuit closer. On the face or dial of the barometer there may be provided a contact plate 22 with which the needle 23 of the barometer is adapted to engage, the said contact member being arranged at a point on the dial, to which point the needle will move when the atmospheric pressure inside the compartment drops below a safety factor. Thus, when the atmospheric pressure is at a dangerous point within the compartment the barometer 21 operates to close the circuit for the solenoid and the valve 14 is moved from its normal position, closes the pipe 9, cuts off the "super-charger" air supply and at the same time opens the pipe 12 and allows the oxygen to be discharged into the compartment. By means of a suitable retractile spring, when the atmospheric pressure reaches the safety factor and the circuit is broken, the valve handle to which the spring is attached is operated so as to move the valve into normal position again.

Means is provided for the controlling of the operation and the effectiveness of the propeller so as to meet with the requirement as to thrust and R. P. M., and compensate for the rarity of the atmosphere at high elevations. One means for so controlling the propeller consists of multi-speed transmission mechanism 24 operatively associated with the engine shaft 25 and the propeller 26. Suitable means, not shown, is provided for controlling the operation of the transmission mechanism. This means may be of any conventional type and is arranged so as to be operated from the operator's compartment. The transmission is so arranged that the propeller may be driven at greater speed than the engine or at a considerably lower speed than the engine or at the same speed. In fact, any relative speed may be provided, as long as the provision is made for the operation of the propeller at a speed greater than that necessary for flight at lower altitudes. The propeller 26 comprises off-set blades 27 fixed about a hub or center member 28. By off-setting the blades, the "wash" of one blade will not interfere with the "wash" of the other, and greater efficiency as to thrust of the blades is, therefore, obtained.

In flight, in high altitudes, the operator must increase the speed of the propeller to compensate for the rarity of the atmosphere and this is accomplished by means of the transmission mechanism. By providing for operation of the propeller at various speeds, the operator may suit the speed to the different conditions encountered at different altitudes.

Another way of controlling the operation of the propeller is illustrated by the propeller means 29, shown in Figures 2, 3 and 5. In this form of the propeller the blades 30 are each rotatable upon its own axis; the mounting of each blade being accomplished in any suitable manner so as to provide for the rotation described. By this arrangement of the blades, the pitch thereof may be changed and preferably worm gear means 31 is disposed in the hub 32 of the propeller and operatively associated with the respective blades. Any suitable means other than the worm means may be provided for turning the propellers on their axis. The means 31 is operated by a shaft 33 which extends into the operator's compartment 4. Suitable means of operative connection designated 34 is provided for transmitting the rotary motion to the shaft 33 to the blades 30. By this means the operator may turn the shaft 33 with a suitable handle, not shown, and in so doing change the pitch of the propellers 30. The worm gear means 31 is such that when the propellers are turned, they will remain in adjusted position and will not be liable to accidentally move out of such position. In operating the plane in high altitudes, the pitch of the propellers is increased so as to compensate for the rarity of the atmosphere. Or the variable pitch may be used in conjunction with the variable speeds.

Suitable instruments, such as usually provided in aeroplanes, are in the operator's compartment 4, the same being a barometer 35 for indicating the atmospheric pressure exteriorly of the compartment, a spirit level 36, and a compass 37. In the lower side of the operator's compartment, that is, the floor thereof, an air outlet 39 is provided. This outlet comprises a valve 38 which is adjustable in any suitable manner so as to regulate the escape of used air into the atmosphere. This valve is maintained open to a certain extent whereby this escape may take place constantly.

In Figs. 8 and 9, I have shown a double wall construction comprising the outer walls 40 and 41 with partition members 42 therebetween. This arrangement is to be used thruout the walls of the operator's compartment to provide for thermally insulating the same.

In Fig. 9, there is shown a modified form of valve for controlling the air supply from the "super-charger" thru the pipe 9. The outer end of the pipe 9 is provided with a valve seat 43 cooperating with which is an outwardly opening check valve 44. A spring 45 holds the valve normally closed. When the "super-charger" is operating the air is conducted thru the pipe 9 and forces the valve 44 to open, whereupon air will enter the compartment 4. If the "super-charger" should fail to work the spring 45 will immediately close the valve 44 to prevent the escape of air out thru the pipe 9. This will prevent a sudden reduction of pressure such as would tend to have a nauseating effect upon the driver or passengers.

I claim:
1. An aeroplane embodying in its construction a fuselage having an air-tight compartment therein, and means for supplying atmospheric air to said compartment, an oxygen supply carried by the body of plane and means operating automatically when the atmospheric pressure in the compartment reaches a predetermined point, to cut off the atmospheric air supply to the compartment and admit oxygen from said tank.

2. An aeroplane embodying in its construction a fuselage, wings associated with the fuselage, an internal combustion motor, an air-tight operator's compartment within the fuselage, with a propeller operated by the motor, a "super-charger" for delivering air to the motor, and means for conducting a portion of the air from the "super-charger" into said compartment, oxygen tanks, means for conducting oxygen from the tanks into the compartment, and means operating automatically when the atmospheric pressure within the compartment reaches a predetermined point for cutting off the air supply from the "super-charger" to the compartment and admitting oxygen from the tanks into said compartment.

ELMER E. NICHOLS.